United States Patent [19]

Seifried et al.

[11] Patent Number: 5,228,944
[45] Date of Patent: Jul. 20, 1993

[54] APPARATUS FOR PRODUCING COMPOSITE BODIES FROM LAYERS OF PLASTIC FLIM LAMINATED TO ONE ANOTHER

[75] Inventors: Walter Seifried; Peter Dinter, Hallgarten; Jochen Coutandin, Langenlonsheim, all of Fed. Rep. of Germany

[73] Assignee: Hoecht Aktiengesellschaft, Frankfurt am Main, Fed. Rep. of Germany

[21] Appl. No.: 654,968

[22] Filed: Feb. 14, 1991

[30] Foreign Application Priority Data

Feb. 15, 1990 [DE] Fed. Rep. of Germany ....... 4004720

[51] Int. Cl.$^5$ .............................................. B32B 31/04
[52] U.S. Cl. ..................... 156/500; 156/197; 156/204; 156/207; 156/245; 156/264; 156/322; 156/522; 156/523; 156/527; 156/574; 156/580; 156/582
[58] Field of Search ............... 156/197, 204, 207, 264, 156/245, 322, 500, 522, 523, 527, 574, 580, 582, 499

[56] References Cited

U.S. PATENT DOCUMENTS

| | | | |
|---|---|---|---|
| 3,044,921 | 7/1962 | Wentworth et al. | 156/264 |
| 3,074,839 | 1/1963 | May et al. | 156/204 |
| 3,166,456 | 1/1965 | White et al. | 156/197 |
| 3,971,691 | 7/1976 | Cairns | 156/582 |

FOREIGN PATENT DOCUMENTS 0207047 12/1986 European Pat. Off. .

Primary Examiner—Caleb Weston
Attorney, Agent, or Firm—Foley & Lardner

[57] ABSTRACT

An apparatus for the continuous production of composite laminate bodies including panels and cylindrical pipes comprises a frame, a laminating mold, a sheet supply roller, a movable pressure roller, at least two preheating rollers and a heating device, wherein the pressure roller, preheating roller and heating device are mounted on the frame, the laminating mold is movable and is adjacent to the frame to form a laminating gap, and the heating device is provided near the laminating gap, so that the sheet travels from the sheet supply roller to the preheating rollers and then to the laminating gap where the sealing material on the sheet surface is heat melted just before being pressed against the laminating mold. By successive lamination of layers of sheet material over the last sheet of material or last section of film by selectively melting the sealing coating on the contact surface of the sheet of material with the heating device just prior to pressing the sheet of material against the laminating mold, an improved composite body having the desired level of thickness with improved load bearing capacity is obtained with increased time efficiency and substantial reductions in potential damages to the product. A process for producing composite bodies from layers of laminated sheets is also disclosed.

11 Claims, 3 Drawing Sheets

APPARATUS FOR PRODUCING COMPOSITE BODIES FROM LAYERS OF PLASTIC FLIM LAMINATED TO ONE ANOTHER

BACKGROUND OF THE INVENTION

1. Field of the Invention

The present invention is directed generally to an apparatus for producing composite bodies from laminated layers of plastic film and other materials, as well as a process for producing composite bodies made from laminated layers of plastic film and other materials.

2. Description of the Prior Art

There is an increasing interest expressed by various industries, such as for example, apparatus engineering, vehicle and aircraft engineering or safety technology, for high-strength composite bodies both in the form of semi-finished products, e.g., panels, and finished products and components. Panel producers have been engaged in the development of techniques for the manufacture of products capable of withstanding higher mechanical loads without loss of physical integrity. Such developments include the modification of polymer materials by the incorporation of reinforcing materials, e.g., textiles, glass and carbon fibers, and the development of techniques for the production of integrally consolidated panels using orienting measures and strategic layering techniques.

The techniques that have been developed encompass roll-press stretching or the process described in EP-A-0 207 047 which discloses a multiplicity of biaxially stretched films provided with thin, coextruded sealing coatings, which are pressed under conditions of pressure and heat to form a homogeneous panel having any desired thickness. For this purpose, a pile of films are generally laid between two pressing plates and introduced to intermittently operating hydraulic plate presses. Process parameters determining the pressing operation are pressure, temperature and time. The last parameter, time, is generally the significant limiting factor in the manufacture and production of inexpensive composite laminates, expecially in the manufacture of very thick panels, in particular with regard to the required throughout heating of the panels. While continuously operated run-through presses, such as double-belt presses, represent a practicable, time-saving solution, they are nevertheless limited in the thickness of the panel which can be processed on them, i.e., there is an upper limitation on the thickness of the panel that can be processed through continuous run-through presses.

The range of problems and shortcomings described above also applies to the manufacture of rotationally symmetrical molded bodies, e.g., cylindrical pipes or vessels. Such molded bodies are manufactured by winding layers of plastic film on a winding mandrel in accordance with the contours of the desired finished product. Accordingly, in order to achieve adequate bonding, the moldings must be treated in a conditioning oven until the temperature of the layers of film near the core of the molding have reached the sealing temperature for the particular plastic film used. In this respect, there is a risk that the time required could cause thermally induced morphological changes to the materials employed on the layers of film further away from the core, and especially near the surface of the molding.

SUMMARY OF THE INVENTION

The present invention overcomes the problems and disadvantage of the prior art by providing a novel apparatus for producing composite bodies from laminated layers of plastic film and by providing a novel process for producing such composite bodies. The present invention represents a vast improvement and a novel approach for satisfying and meeting the needs, requirements and criteria for effective and useful manufacture and production of composite bodies in a safe, cost effective and time efficient manner.

The object of the present invention is to provide an apparatus for producing composite bodies from laminated layers of plastic film of the type as described above in order to achieve continuous, cost-saving manufacture and production of planar composite panels or cylindrical composite bodies of any desired thickness using sheets of materials such as plastic film sheets.

Another object of the present invention is to provide a process for producing planar composite panels or cylindrical composite bodies of any desired thickness using sheets of materials such as plastic film sheets in a cost and time efficient manner.

Additional objects and advantages of the present invention will be set forth, in part, in the description which follows and, in part, will be obvious from the description or may be learned by practice of the invention. The objects and advantages of the invention may be learned by and attained by means of the instrumentalities and combination of steps particularly pointed out in the appending claims.

To achieve the foregoing objects and in accordance with the purpose of the present invention, as embodied and broadly described herein, the apparatus of the present invention comprises a frame, a laminating mold, a continuous sheet supply roller, a pressure roller, a preheating roller, and a heating device, wherein the laminating mold, pressure roller, preheating roller and heating device are mounted on the frame, the laminating mold is movably provided adjacent the pressure roller to render the laminating mold and pressure mold in juxtaposed configuration to form a laminating gap, and the heating device is provided adjacent to the laminating gap, such that a sheet travel path extends from the sheet supply roller to the preheating roller, to the laminating gap, past the heating device to the pressure roller and then onto the laminating mold.

An alternate apparatus of the present invention for producing composite bodies from layers of laminated sheets of materials comprises a frame, a laminating mold, at least an initial and a subsequent continuous sheet supply roller, at least two corresponding preheating rollers for each supply roller, at least an initial and a subsequent pressure roller, at least one corresponding heating device for each pressure roller, and at least one corresponding cross cutter for each pressure roller, wherein the pressure rollers, preheating rollers and heating devices are mounted on the frame, the laminating mold has a pressing plate mounted on a movable carriage for relative back and forth movement adjacent the frame to render the laminating mold and each of the pressure rollers in juxtaposed configuration in an alternating manner with the relative back and forth movement of the laminating mold to form a laminating gap between the laminating mold and each of the pressure rollers when the laminating mold and each of the respective pressure rollers are in juxtaposed configuration, and the heating device is provided adjacent to each respective laminating gap, such that when the laminating mold is in an initial position, an initial sheet travel path extends from an initial sheet supply roller to the preheating rollers, to the laminating gap, past the heating device to the pressure roller, onto the laminating mold, and ends at the respective cross cutter, and when the laminating mold is in an subsequent position, a subsequent sheet travel path extends from a subsequent sheet supply roller to the preheating rollers, to the laminating gap, past the heating device to the pressure roller, onto the laminating mold and ends at the respective cross cutter.

In further accordance with the objectives and purpose of the present invention, the process for producing composite bodies from layers of laminated sheets comprises successive lamination bonding of each layer of sheet material on a laminating mold by pressing each layer under heat and pressure against the laminating mold until a predetermined thickness of laminated layers of sheet material is achieved, wherein the sheet material is provided on at least one surface with a sealing coating and each of the successive lamination bonding of each layer of sheet material is achieved by selective incipient melting of the sealing coating before the pressing of the sheet material against the lamination mold.

The process for producing composite bodies of selectable thickness from biaxially and/or monoaxially and/or unstretched thermoplastic, coextruded plastic films, which are provided with a sealing coating on at least one side, by pressing under suitable conditions of pressure and heat, is distinguished by the fact that, beginning with the first layer of film, the composite body is formed by continuous, additive laminating of successive layers of film on top of the previous layer of film until the desired level of panel thickness is obtained with bonding between each layer of film being effected by selective incipient melting of the sealing coatings on the film layer just before intimate contact is made between successive film layers.

Building up the thickness of a composite panel by continuous, additive laminating of successive individual layers of film on top of each other is achieved by melting only the heat-sealing coatings just before pressing operation under linear pressurization of the layers of film. In comparison with the time-consuming, conventional pressing of a compact pile of films in plate presses, or the initiation of thermal film shrinkage necessary for homogeneous bonding in the case of pipe production, the present invention represents a vast improvement and advantage thereover in that the heating and incipient melting operation can be carried out on the sealing coatings to a depth of just a few microns over an extremely brief period of time with subsequent bonding and, as a result, without thermal damage to the film materials. In contrast to pressing a compact pile of films, in which each layer of film has a different temperature profile, the pressing operation for each and every layer of film in the present invention is always performed under constant, uniform, non-stressed and completely controlled conditions of heat, pressure, and time.

The accompanying drawings, which are incorporated in and constitute a part of this specification, illustrate preferred embodiments of the present invention and together with the description, serve to explain the principles of the present invention.

DESCRIPTION OF THE PREFERRED EMBODIMENTS

Reference will now be made, in detail, to a preferred embodiment of the present invention, examples of which are illustrated in the accompanying drawings. Whenever possible, the same reference numbers will be used throughout the drawings to refer to the same or like parts.

Figure 1:
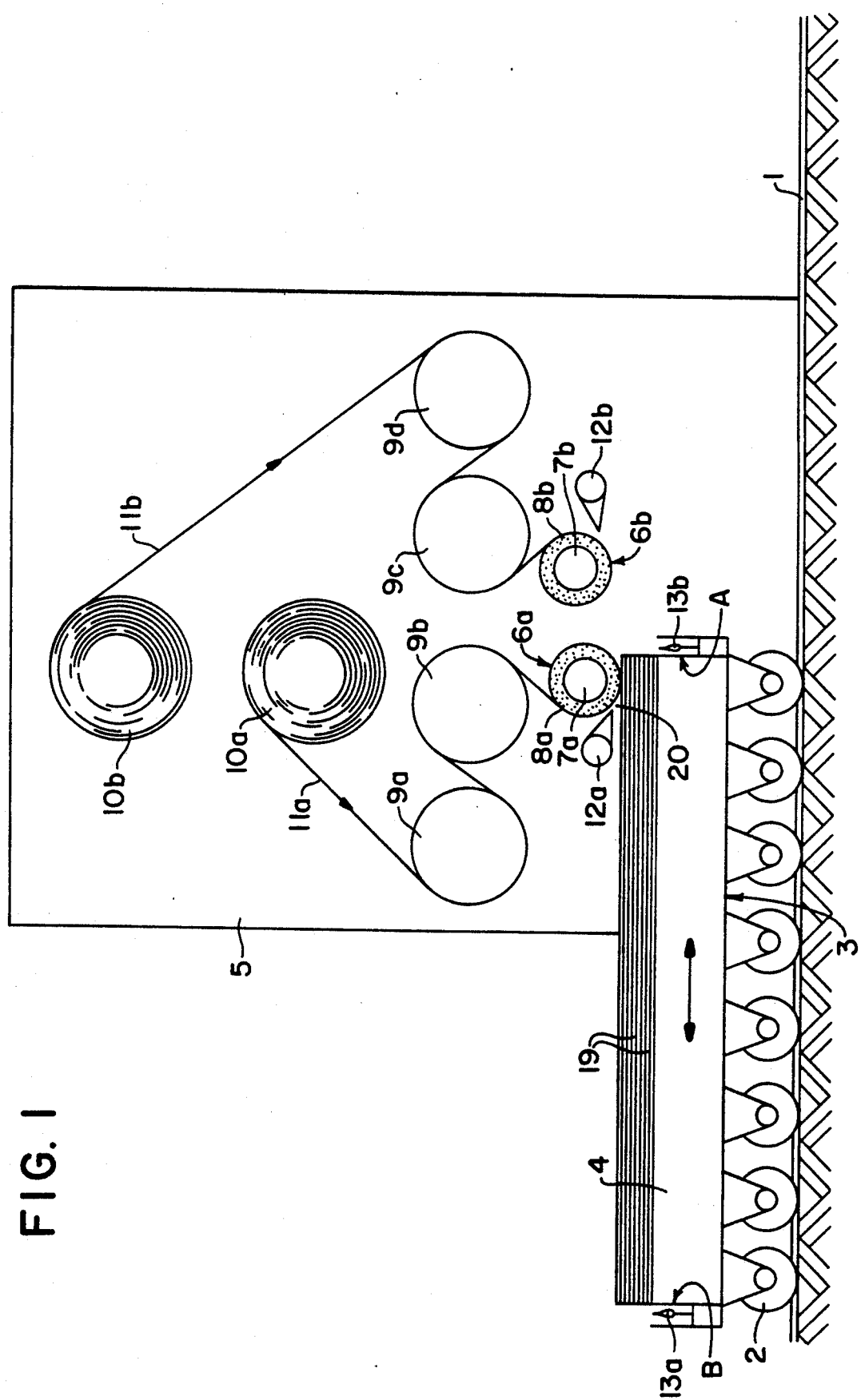
FIG. 1 is a schematic diagram showing a first embodiment of the apparatus of the present invention for making planar composite bodies.

Referring to FIG. 1 and in accordance with the present invention, it may be seen that a panel laminating apparatus comprises a pressing plate 4 that is heatable and rotatably mounted on a laminating mold 3 in the form of a carriage having rollers or wheels 2 and mounted on rails 1 to allow horizontal movement in a forward and backward direction by drive means such as a motor (not shown). Two pressure rollers 6a and 6b are mounted on a frame 5 positioned directly above the carriage 3. The pressure rollers 6a and 6b are mounted to allow vertical movement in an up and down direction, and metal roller bodies 7a and 7b of the pressure rollers are covered with heat resistant flexible coverings 8a and 8b such as heat resistant rubber. Each pressure roller 6a and 6b has at least two preheating rollers 9a, 9b and 9c, 9d, respectively, that preheat the film sheets 11a and 11b, respectively, fed from two supply rollers 10a and 10b, respectively, to the pressure rollers 6a and 6b, respectively. The incipient melting of the sealing coatings of the film sheets 11a and 11b that is necessary for the achievement of a permanent bonding strength is achieved by means of heating devices 12a and 12b, respectively, in the form of hot-air nozzles, installed near laminating gaps 20 that exist between the pressure rollers 6a, 6b and the pressing plate 4 on the carriage 3.

In the simplest case, air can be heated to the necessary temperature in heating registers (not shown) and administered through hot-air nozzles installed near laminating gaps 20. IR radiators, ultrasonic or microwave probes may also be used as heating devices. The heating devices generally operate in cycles depending on the respective pressure roller in working position at the time, i.e., the heating devices operate in synchrony with the operating cycles of the respective pressure roller, i.e., intermittently.

Cross cutters 13a and 13b may be pneumatically or hydraulically operated and are located at the end faces A and B, respectively, of the carriage 3. Cross cutters 13a and 13b format the film sheets 11a and 11b, respectively, into layers of plastic film 19 that are piled one on top of the other.

Figure 2:
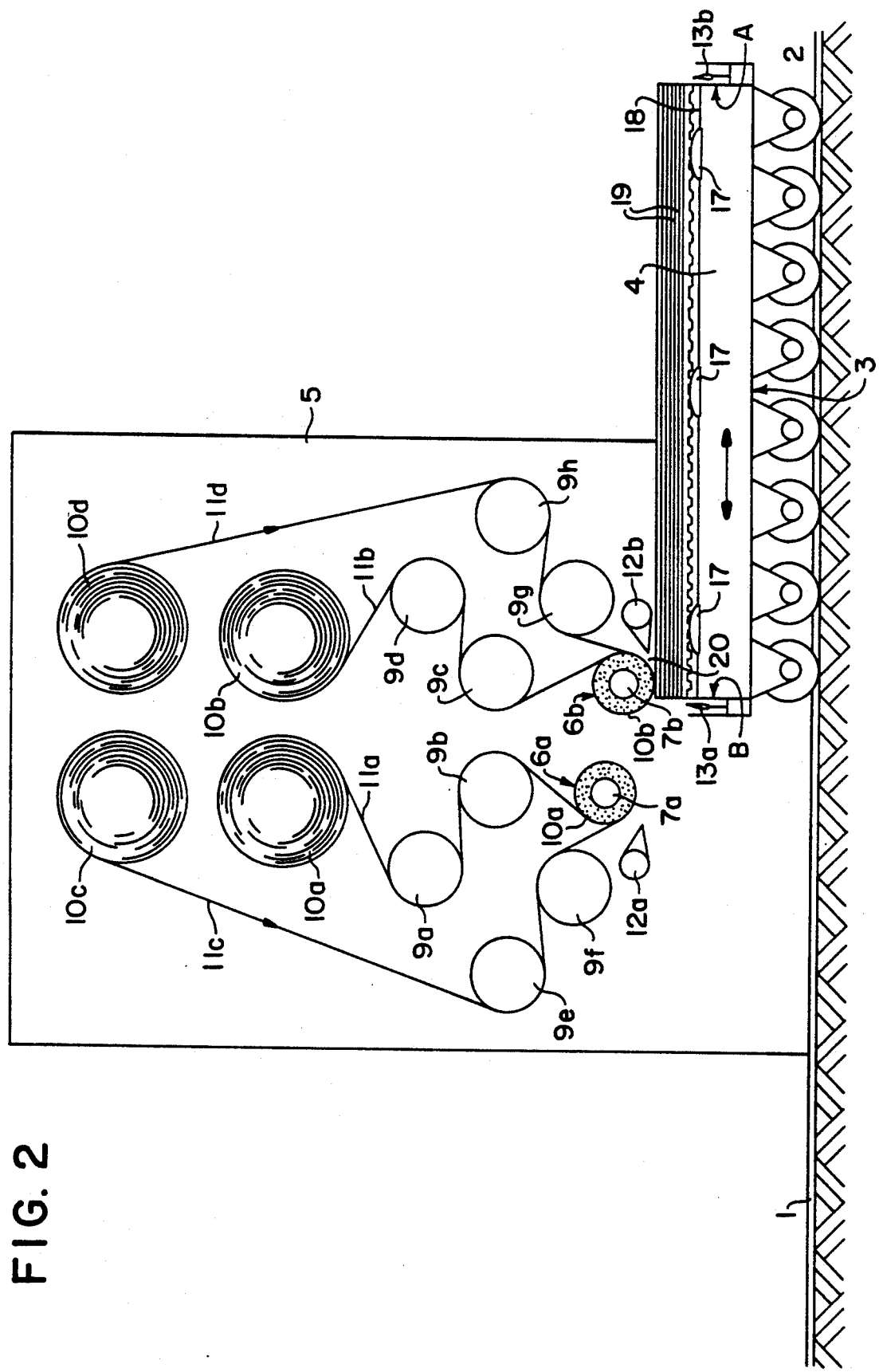
FIG. 2 is a schematic diagram showing a second embodiment of the apparatus of the present invention for making planar composite bodies.

The embodiment of the laminating apparatus of the present invention shown in FIG. 2 differs from the embodiment of the laminating apparatus of the present invention shown in FIG. 1 mainly in that there are more than two film sheets, i.e., a total of four film sheets 11a, 11b, 11c, 11d. In addition to the two supply rollers 10a and 10b, two additional supply rollers 10c and 10d are mounted on the frame 5. The film sheets 11a, 11c and 11b, 11d of the supply rollers 10a, 10c and 10b, 10d, respectively, interacting in their respective pairs, are brought together, lying one on top of the other, to pressure rollers 6a and 6b, respectively. The two pairs of film sheets 11a, 11c and 11b, 11d are then brought around pressure rollers 6a and 6b, respectively, and subjected to pressure by the respective pressure rollers, 6a and 6b, that has been lowered to its closed position, against the surface of the pressing plate 4 mounted on the carriage 3, initially, and thereafter on top of the layers of film 19 being formed on the pressing plate 4. The film sheets 11a, 11c and 11b, 11d may be composed of the same and/or different plastics, depending on the desired characteristics of plastics, in any combination.

Referring to FIG. 1, the operation of the first embodiment will be described in further detail.

After the carriage 3 is pre-heated to the desired operating temperature, and positioned in its starting position, i.e., the end face A is directly beneath the pressure roller 6a that is in the open, raised position, the film sheet 11a is threaded into the laminating apparatus in the manner shown in FIG. 1 and described previously in order that the end of the film sheet 11a comes to rest against the end face A of the pressing plate 4. While the pressure roller 6a is lowered into its closed working position with the attendant laminating pressure, pressure roller 6b is maintained in its open position. The carriage 3 is then moved horizontally in the direction traveling from pressure roller 6a to pressure roller 6b. When the end face B of the carriage 3 is in a position directly beneath pressure roller 6a, pressure roller 6a is raised into its open position, and the carriage 3 continues to move in the same direction until it reaches its end position, i.e. until its end face B is positioned directly beneath pressure roller 6b. The film sheet 11b is threaded in the manner as shown in FIG. 1 and as previously described so that its end rests against the end face B of the pressing plate 4. While the pressure roller 6b is being lowered into its closed working position with the attendant laminating pressure, the film sheet 11a is cut by cross cutter 13a, and the first layer of the layers of film 19 is deposited on the pressing plate 4. When the carriage 3 begins to move in the opposite direction, i.e., in the direction traveling from pressure roller 6b to pressure roller 6a, air that has been heated to the appropriate and desired temperature is administered through the hot-air nozzle 12b to heat the sealing coating on the film sheet 11b. The air may be heated by a separate heating means (not shown) and administered through the hot-air nozzle 12b or the hot-air nozzle 12b may incorporate a heating device.

As the end face A of the carriage 3 reaches the pressure roller 6b, i.e., when the end face A is positioned directly beneath pressure roller 6b, the pressure roller 6b is raised to its open position, and the carriage 3 continues to move in the same direction until it reaches its end position, i.e. until its end face A is positioned directly beneath pressure roller 6a that is in the open position. At this point, the first lamination operation with the first and second layers of the layers of film 19 is completed.

The pressure roller 6a is then lowered into its working, closed position while at the same time the film sheet 11b is cut by cross cutter 13b, and a third layer of the film sheet 11a is laminated on top of the second layer of the layers of film 19 in the manner as described above. The sequence of laminating additional layers may be repeated until the desired level of thickness of the layers of film 19 is obtained. In this manner, panels having any desired thickness may be produced.

In the production of panels having a homogenous composition, it is, of course, necessary to use identical film material as the film sheets 11a, 11b. It is also possible, however, to vary the film materials to produce sandwich panels having different plastic films and different materials according to the characteristics that are desired for the panel. For example, the physical properties of different types of plastics as well as textiles of natural or synthetic fibers, non-wovens, metal foils, metal gauzes or the like can be evaluated in order to formulate the particular combination of materials necessary to fulfill and satisfy the needs and requirements of a particular application. As necessary, appropriate coatings of adhesion promotors such as self-supporting films of hotmelt materials and the like may be used in conjunction with materials that may not readily laminate in layer form. Accordingly, it may be desirable to design the supply rollers 10a and 10b to include a high speed, reversible winding system in order that rapid change of the supply rollers 10a and 10b to change the type of materials that are to be laminated to one another can be carried out in a simple and efficient manner.

It is to be understood that the prominent reference and use of coextruded films provided with sealing coatings in the present description for the pressing of composite bodies are not intended in any way to restrict the type of starting materials that are contemplated within the scope of the present invention. For example, a practical alternative to building up the thickness of the composite body with coextruded sealing films would be to use alternating layers of the same monofilm material with different degrees of orientation in order to benefit from the resulting variances in morphological structure. Additionally, in comparison with unstretched films, monoaxially or biaxially stretched films have a distinctly higher crystallinity (as can be demonstrated by means of X-ray measuring methods), and this is reflected in inter alia different melting temperatures of the polymer films. This difference in melting temperatures can be beneficially utilized in the context of the present invention. Composite bodies can be produced according to the present invention by arranging alternating layers of unstretched and stretched films. The apparatus of the present invention is operated so that the unstretched films just melt under processing temperature conditions and serve the function of an adhesion promoter with respect to the stretched films that would not melt at the processing temperature conditions. Accordingly, films can be laminated to one another without employing sealing coatings.

The operation of the embodiment of the apparatus according to FIG. 2 is different from the operation of the embodiment of the apparatus according to FIG. 1 in that, for the purpose of shortening the manufacturing cycle, in each of the laminating steps, two film sheets are in each case piled and simultaneously laminated one on top of the other on the layers of film 19 in the same sequence of steps as described above.

During regular operations of manufacturing planar panels with smooth surfaces, the surface finish of the pressing plate 4, e.g., polished chromium, of the carriage 3 will be adequate in imparting an acceptable level of smoothness to the surface finish of the panel. It is, however, possible to make panels having embossed surface finishes by mounting textured pressing sheets 18 on top of the carriage before conducting laminating operations (see FIG. 2). A wide variety of embossed surface finish is thereby readily impartible to panels made in accordance with the present invention. The textured pressing sheets 18 may be fixed by clamping means 17 (e.g., claws) mounted on top of the pressing plate 4, which is pivotable in its plane.

Figure 3:
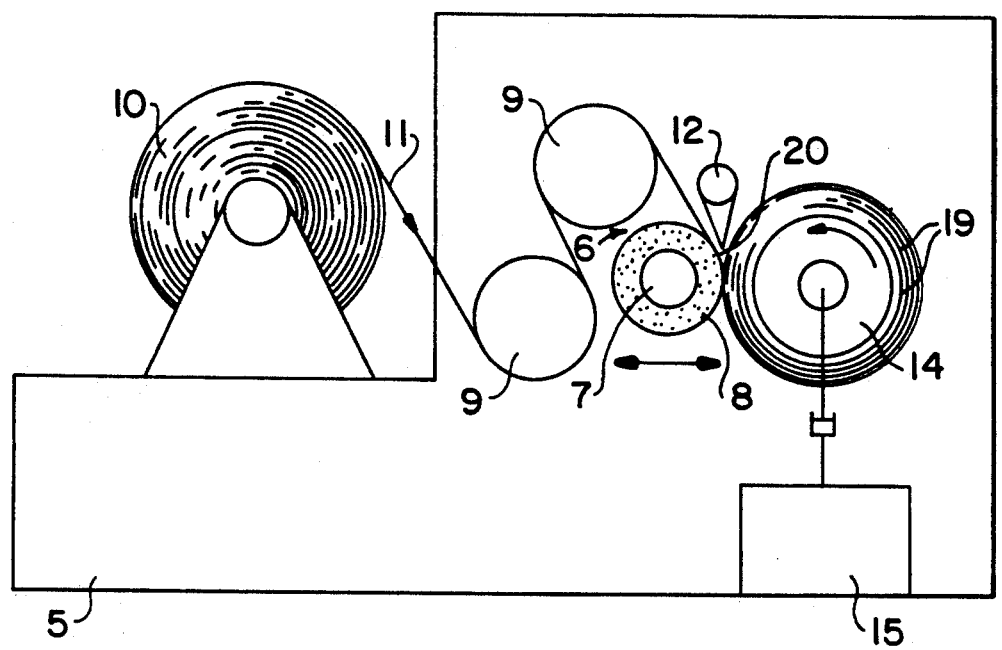
FIG. 3 is a schematic diagram showing a third embodiment of the apparatus of the present invention for making cylindrical composite bodies.

Referring to FIG. 3, a third embodiment of the apparatus of the present invention suitable for the production of cylindrical pipes or conduits is shown. This third embodiment of the apparatus of the present invention comprises a metallic, heatable, cylindrical winding mandrel 14, which, with the likewise metallic, heatable pressure roller 6, comprising a metal roller core 7 provided with a heat resistant flexible covering 8, forms a laminating unit for bringing the film sheet 11 and the layers of film 19 together under linear pressurization. The cylindrical winding mandrel 14 is rotatably mounted in a fixed location on the machine frame 5 with bearings and is operatively coupled with a drive unit 15. This simplifies the mounting of the cylindrical winding mandrel 14 and the removal of the finished wound product. The speed of the drive unit 15 is variable and, thus, variable lag, e.g., with respect to the drive for the laminating unit, is easily effected by which tension of a desired magnitude can be induced upon the film sheet 11.

The positioning of the pressure roller 6 into its working position may be effected by, for example, either hydraulic or pneumatic movement along a horizontal slide construction or by mechanical, swiveling action of a lever mechanism. As may be appropriate, the preheating rollers 9 could be integrated with the slide construction or lever mechanism to allow for coordinated movement between the pressure roller 6 and the preheating rollers 9. The plastic film required for winding over the cylindrical winding mandrel 14 is supplied from a supply roller 10. The incipient melting of the sealing coatings of the film sheet 11 and the layers of film 19 immediately before bringing them together in the laminating gap 20 may be performed by a directed stream of heated air from the air nozzle of the heating device 12 that is arranged next to the laminating gap 20. During this operation, the heat resistant flexible covering 8 of the pressure roller 6 ensures intimate contact of the film sheet 11 and the layers of film 19 at their interface in the laminating gap 20 irrespective of the profile quality of the films and prevents the entrapment of air bubbles between the film sheet 11 and the layers of film 19 forming the cylindrical composite body.

Figure 4:
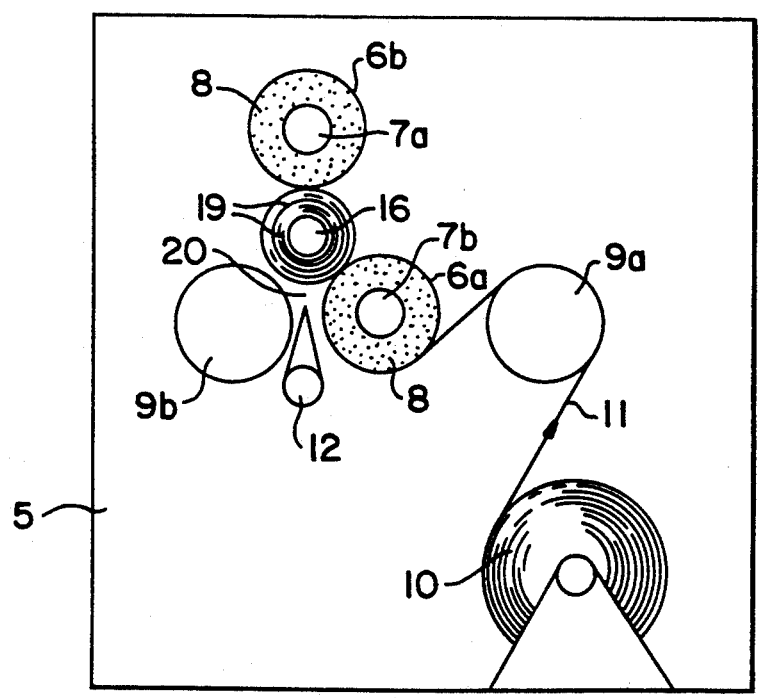
FIG. 4 is a schematic diagram showing a fourth embodiment of the apparatus of the present invention for making cylindrical composite bodies that are of greater length and smaller diameter than the cylindrical composite bodies that may be produced using the third embodiment of the present invention as shown in FIG. 3.

The embodiment of the apparatus of the present invention shown in FIG. 4 is particularly suitable for the winding of very long cylindrical composite bodies having smaller diameters. In order to compensate for those instances where sagging of the cylindrical winding mandrel 14 is unavoidable, a preheating roller 9b, in addition to the preheating roller 9a, is provided for additional support, with pressure rollers 6a and 6b having heat resistant flexible covering 8 providing laminating pressure. Pressure roller 6b acts also as a holddown device in order to ensure the proper positioning and centering of the winding mandrel. Heated roller 6a exclusively preheats film sheet 11 fed from the supply roller 10. The incipient melting of the sealing coating of the film sheet 11 is carried out using heated air blown through the air nozzle of heating device 12 positioned near the laminating gap 20.

With regard to the laminating process disclosed in the instant invention, this process differs from other known pressing processes for the production of composite panel in that the following advantages are realized by use of the present laminating process.

Time savings are realized due to virtually continuous production of composite bodies or panels. Brief incipient melting limited to the sealing coatings to be bonded reduces the thermally induced degradation of the physical properties of the polymer films.

All the films of a composite body or of a composite panel experience the same temperature field, so property-changing, morphological inhomogeneities over the thickness of the panel can be avoided. In comparison with plate presses which exert a surface pressure, a reduced laminating pressure, namely a linear pressure, is applied in the process of the present invention. Linear pressure at the laminating gap of the pressure roller prevents air being drawn in between the layers of film, which would be detrimental to quality. The virtually continuous process sequence permits permanent monitoring of the product properties, especially when changing the process parameters. Finally, a rapid change-over of production is possible by use of the process of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for producing composite bodies from layers of laminated sheets of material, comprising:
   a frame;
   a laminating mold;
   at least an initial and a subsequent continuous sheet supply roller;
   at least two corresponding preheating rollers for each supply roller;
   at least an initial and a subsequent pressure roller;
   at least one corresponding heating device for each pressure roller; and
   at least one corresponding cross cutter for each pressure roller; wherein
   the pressure rollers, the preheating rollers and the heating devices are mounted on the frame,
   the laminating mold has a pressing plate mounted on a movable carriage for relative back and forth movement adjacent the frame to render the laminating mold and each of the pressure rollers in juxtaposed configuration in an alternating manner with the relative back and forth movement of the laminating mold to form a laminating gap between the laminating mold and each of the pressure rollers when the laminating mold and each of the respective pressure rollers are in juxtaposed configuration, and a heating device is provided adjacent to each respective laminating gap, such that when the laminating mold is in an initial position, an initial sheet travel path extends from an initial sheet supply roller to the corresponding preheating rollers, to the corresponding laminating gap, past the corresponding heating device to the initial pressure roller, onto the laminating mold, and ends at the respective cross cutter, and when the laminating mold is in a subsequent position, a subsequent sheet travel path extends from a subsequent sheet supply roller to the corresponding preheating rollers, to the corresponding laminating gap, past the corresponding heating device to the subsequent pressure roller, onto the laminating mold and ends at the respective cross cutter.

2. The apparatus as claimed in claim 1, wherein said heating devices operate in synchrony with the operating cycles of the respective, corresponding pressure roller.

3. The apparatus as claimed in claim 1, wherein the movable carriage is mounted on rollers.

4. The apparatus as claimed in claim 1, wherein the pressing plate is heatable.

5. The apparatus as claimed in claim 1, wherein the carriage has clamping devices for fixing pressing sheets on the pressing plate.

6. The apparatus as claimed in claim 1, wherein the cross cutters are provided at the sides of the carriage.

7. The apparatus as claimed in claim 1, wherein the pressing plate is rotatably mounted in its plane.

8. The apparatus as claimed in claim 1, wherein the heating devices are selected from the group consisting of hot-air nozzles, infra-red radiators, ultrasonic probes and microwave probes.

9. The apparatus as claimed in claim 1, further comprising a second initial continuous sheet supply roller paired with the initial continuous sheet supply roller and a second subsequent continuous sheet supply roller paired with the subsequent continuous sheet supply roller, wherein the continuous sheets of the paired supply rollers are brought together at the respective pressure rollers of their first initial and subsequent continuous sheet supply rollers.

10. The apparatus as claimed in claim 9, wherein each of the pressure rollers is preceded by at least two supply rollers and at least four preheating rollers, respectively.

11. The apparatus as claimed in claim 1, wherein the distance of the relative back and forth movement of the laminating mold in any one direction is at least equal to the length of the pressing plate on the carriage plus the distance between the axes of the initial and subsequent pressure rollers.

* * * * *